US010158384B1

(12) United States Patent
Yarga et al.

(10) Patent No.: US 10,158,384 B1
(45) Date of Patent: Dec. 18, 2018

(54) ELECTRONIC DEVICES WITH INDIRECTLY-FED ADJUSTABLE SLOT ELEMENTS

(71) Applicant: Apple Inc., Cupertino, CA (US)

(72) Inventors: Salih Yarga, Sunnyvale, CA (US); Xu Gao, Santa Clara, CA (US); Georgios Atmatzakis, Cupertino, CA (US); Xu Han, Santa Clara, CA (US); Bilgehan Avser, Mountain View, CA (US); Hao Xu, Cupertino, CA (US); Yijun Zhou, Mountain View, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 3 days.

(21) Appl. No.: 15/699,869

(22) Filed: Sep. 8, 2017

(51) Int. Cl.
*H04M 1/00* (2006.01)
*H04B 1/04* (2006.01)
*H01Q 1/24* (2006.01)

(52) U.S. Cl.
CPC ........... *H04B 1/0483* (2013.01); *H01Q 1/243* (2013.01); *H04B 1/0458* (2013.01)

(58) Field of Classification Search
CPC .......................... H04B 1/0483; H04B 1/0458
USPC ..................................................... 455/575.7
See application file for complete search history.

(56) References Cited

U.S. PATENT DOCUMENTS

| | | | |
|---|---|---|---|
| 8,615,209 B1* | 12/2013 | Khlat | H04W 52/30 455/126 |
| 9,059,504 B2* | 6/2015 | Eom | H01Q 5/35 |
| 9,236,659 B2* | 1/2016 | Vazquez | H01Q 13/103 |
| 9,577,318 B2* | 2/2017 | Pascolini | G06K 9/00006 |
| 9,583,838 B2* | 2/2017 | Zhu | H01Q 13/10 |
| 9,627,770 B2* | 4/2017 | Svendsen | H01Q 13/103 |
| 9,680,510 B2* | 6/2017 | Broyde | H01Q 1/52 |
| 9,768,491 B2* | 9/2017 | Jin | H01Q 1/243 |
| 9,768,506 B2* | 9/2017 | Krogerus | H01Q 5/30 |
| 9,813,532 B2* | 11/2017 | Kim | H04M 1/026 |
| 9,876,272 B2* | 1/2018 | Hu | H01Q 1/243 |
| 2015/0303568 A1* | 10/2015 | Yarga | H01Q 5/321 343/720 |
| 2017/0264001 A1* | 9/2017 | Azad | H01Q 9/0442 |

* cited by examiner

*Primary Examiner* — April G Gonzales
(74) *Attorney, Agent, or Firm* — Treyz Law Group, P.C.; Joseph F. Guihan

(57) ABSTRACT

An electronic device may be provided with wireless circuitry and control circuitry. The wireless circuitry may include multiple antennas and transceiver circuitry. An antenna in the electronic device may have an inverted-F antenna resonating element formed from portions of a peripheral conductive electronic device housing structure and may have an antenna ground that is separated from the antenna resonating element by a gap. The antenna may also include an indirectly-fed antenna resonating element that is indirectly fed by a harmonic mode of the inverted-F antenna resonating element via near field electromagnetic coupling. The indirectly-fed antenna resonating element may be a slot. The antenna ground may define at least three edges of the slot and the slot may be aligned with a dielectric-filled gap in the peripheral conductive housing structures. An adjustable circuit may be coupled across the slot to tune the indirectly-fed antenna resonating element.

20 Claims, 10 Drawing Sheets

ELECTRONIC DEVICES WITH INDIRECTLY-FED ADJUSTABLE SLOT ELEMENTS

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It can be challenging to form electronic device antenna structures with desired attributes. In some wireless devices, antennas are bulky. In other devices, antennas are compact, but are sensitive to the position of the antennas relative to external objects. If care is not taken, antennas may become detuned, may emit wireless signals with a power that is more or less than desired, or may otherwise not perform as expected.

It would therefore be desirable to be able to provide improved wireless circuitry for electronic devices.

SUMMARY

An electronic device may be provided with wireless circuitry and control circuitry. The wireless circuitry may include multiple antennas and transceiver circuitry. The antennas may include antenna structures at opposing first and second ends of the electronic device. The antenna structures at a given end of the device may include adjustable components that are adjusted by the control circuitry to place the antenna structures and the electronic device in one of a number of different operating modes or states.

The antenna may have an inverted-F antenna resonating element formed from portions of a peripheral conductive electronic device housing structure and may have an antenna ground that is separated from the antenna resonating element by a gap. A short circuit path may bridge the gap. An antenna feed may be coupled across the gap in parallel with the short circuit path.

The antenna may include an indirectly-fed antenna resonating element. The indirectly-fed antenna resonating element may be indirectly fed by a harmonic mode of the inverted-F antenna resonating element via near field electromagnetic coupling. The indirectly-fed antenna resonating element may be a slot. The antenna ground may define at least three edges of the slot and the slot may be aligned with a dielectric-filled gap in the peripheral conductive housing structures.

An adjustable circuit may be included on a flexible printed circuit that is coupled across the slot. The adjustable circuit may have a first ground terminal coupled to a first side of the slot and a second ground terminal coupled to a second side of the slot. The adjustable circuit may adjust the resonance of the slot between a frequency in a high band and a frequency in an ultra-high band. The adjustable circuit may include a component in series with a switch between the first ground terminal and the second ground terminal. The slot may resonate at the frequency in the high band when the switch is in a first state and may resonate at the frequency in the ultra-high band when the switch is in a second state.

DETAILED DESCRIPTION

Figure 1:
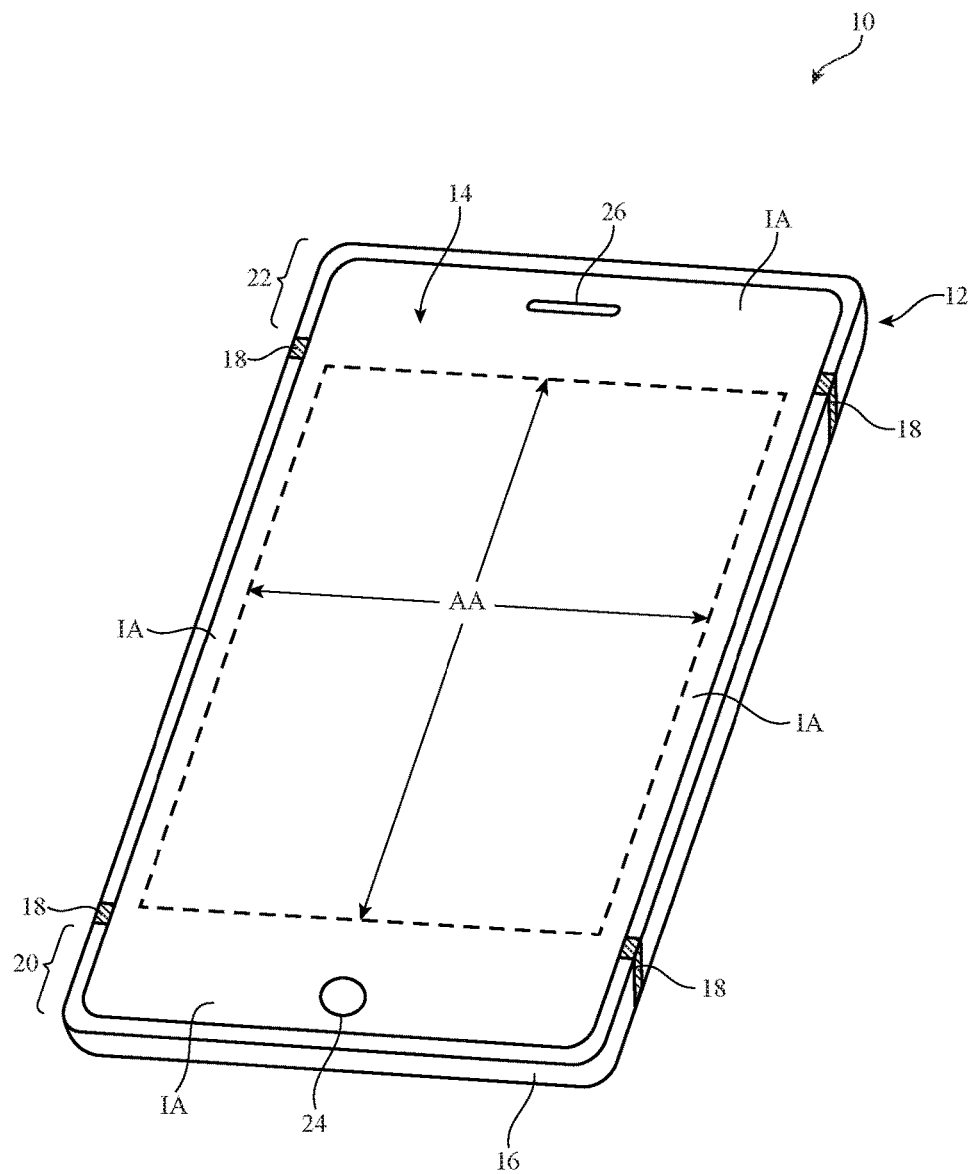
FIG. 1 is a perspective view of an illustrative electronic device in accordance with an embodiment.

Electronic devices such as electronic device 10 of FIG. 1 may be provided with wireless communications circuitry. The wireless communications circuitry may be used to support wireless communications in multiple wireless communications bands.

The wireless communications circuitry may include one more antennas. The antennas of the wireless communications circuitry can include loop antennas, inverted-F antennas, strip antennas, planar inverted-F antennas, slot antennas, hybrid antennas that include antenna structures of more than one type, or other suitable antennas. Conductive structures for the antennas may, if desired, be formed from conductive electronic device structures.

The conductive electronic device structures may include conductive housing structures. The housing structures may include peripheral structures such as peripheral conductive structures that run around the periphery of an electronic device. The peripheral conductive structures may serve as a bezel for a planar structure such as a display, may serve as sidewall structures for a device housing, may have portions that extend upwards from an integral planar rear housing (e.g., to form vertical planar sidewalls or curved sidewalls), and/or may form other housing structures.

Gaps may be formed in the peripheral conductive structures that divide the peripheral conductive structures into peripheral segments. One or more of the segments may be used in forming one or more antennas for electronic device 10. Antennas may also be formed using an antenna ground plane and/or an antenna resonating element formed from conductive housing structures (e.g., internal and/or external structures, support plate structures, etc.).

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a planar housing wall. The rear housing wall may have slots that pass entirely through the rear housing wall and that therefore separate housing wall portions (and/or sidewall portions) of housing 12 from each other. The rear housing wall may include conductive portions and/or dielectric portions. If desired, the rear housing wall may include a planar metal layer covered by a thin layer or coating of dielectric such as glass, plastic, sapphire, or ceramic. Housing 12 (e.g., the rear housing wall, sidewalls, etc.) may also have shallow grooves that do not pass entirely through housing 12. The slots and grooves may be filled with plastic or other dielectric. If desired, portions of housing 12 that have been separated from each other (e.g., by a through slot) may be joined by internal conductive structures (e.g., sheet metal or other metal members that bridge the slot).

Display 14 may include pixels formed from light-emitting diodes (LEDs), organic LEDs (OLEDs), plasma cells, electrowetting pixels, electrophoretic pixels, liquid crystal display (LCD) components, or other suitable pixel structures. A display cover layer such as a layer of clear glass or plastic may cover the surface of display 14 or the outermost layer of display 14 may be formed from a color filter layer, thin-film transistor layer, or other display layer. Buttons such as button 24 may pass through openings in the cover layer if desired. The cover layer may also have other openings such as an opening for speaker port 26.

Housing 12 may include peripheral housing structures such as structures 16. Structures 16 may run around the periphery of device 10 and display 14. In configurations in which device 10 and display 14 have a rectangular shape with four edges, structures 16 may be implemented using peripheral housing structures that have a rectangular ring shape with four corresponding edges (as an example). Peripheral structures 16 or part of peripheral structures 16 may serve as a bezel for display 14 (e.g., a cosmetic trim that surrounds all four sides of display 14 and/or that helps hold display 14 to device 10). Peripheral structures 16 may, if desired, form sidewall structures for device 10 (e.g., by forming a metal band with vertical sidewalls, curved sidewalls, etc.).

Peripheral housing structures 16 may be formed of a conductive material such as metal and may therefore sometimes be referred to as peripheral conductive housing structures, conductive housing structures, peripheral metal structures, or a peripheral conductive housing member (as examples). Peripheral housing structures 16 may be formed from a metal such as stainless steel, aluminum, or other suitable materials. One, two, or more than two separate structures may be used in forming peripheral housing structures 16.

It is not necessary for peripheral housing structures 16 to have a uniform cross-section. For example, the top portion of peripheral housing structures 16 may, if desired, have an inwardly protruding lip that helps hold display 14 in place. The bottom portion of peripheral housing structures 16 may also have an enlarged lip (e.g., in the plane of the rear surface of device 10). Peripheral housing structures 16 may have substantially straight vertical sidewalls, may have sidewalls that are curved, or may have other suitable shapes. In some configurations (e.g., when peripheral housing structures 16 serve as a bezel for display 14), peripheral housing structures 16 may run around the lip of housing 12 (i.e., peripheral housing structures 16 may cover only the edge of housing 12 that surrounds display 14 and not the rest of the sidewalls of housing 12).

If desired, housing 12 may have a conductive rear surface or wall. For example, housing 12 may be formed from a metal such as stainless steel or aluminum. The rear surface of housing 12 may lie in a plane that is parallel to display 14. In configurations for device 10 in which the rear surface of housing 12 is formed from metal, it may be desirable to form parts of peripheral conductive housing structures 16 as integral portions of the housing structures forming the rear surface of housing 12. For example, a rear housing wall of device 10 may be formed from a planar metal structure and portions of peripheral housing structures 16 on the sides of housing 12 may be formed as flat or curved vertically extending integral metal portions of the planar metal structure. Housing structures such as these may, if desired, be machined from a block of metal and/or may include multiple metal pieces that are assembled together to form housing 12. The planar rear wall of housing 12 may have one or more, two or more, or three or more portions. Peripheral conductive housing structures 16 and/or the conductive rear wall of housing 12 may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide structures 16 from view of the user).

Display 14 may have an array of pixels that form an active area AA that displays images for a user of device 10. An inactive border region such as inactive area IA may run along one or more of the peripheral edges of active area AA.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a backplate) that spans the walls of housing 12 (i.e., a substantially rectangular sheet formed from one or more metal parts that is welded or otherwise connected between opposing sides of member 16). The backplate may form an exterior rear surface of device 10 or may be covered by layers such as thin cosmetic layers, protective coatings, and/or other coatings that may include dielectric materials such as glass, ceramic, plastic, or other structures that form the exterior surfaces of device 10 and/or serve to hide the backplate from view of the user. Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 16 and opposing conductive ground structures such as conductive portions of housing 12, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 20 and 22 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 20 and 22. If desired, the ground plane that is under active area AA of display 14 and/or other metal structures in device 10 may have portions that extend into parts of the ends of device 10 (e.g., the ground may extend towards the dielectric-filled openings in regions 20 and 22), thereby narrowing the slots in regions 20 and 22.

In general, device 10 may include any suitable number of antennas (e.g., one or more, two or more, three or more, four or more, etc.). The antennas in device 10 may be located at opposing first and second ends of an elongated device housing (e.g., at ends 20 and 22 of device 10 of FIG. 1), along one or more edges of a device housing, in the center of a device housing, in other suitable locations, or in one or more of these locations. The arrangement of FIG. 1 is merely illustrative.

Portions of peripheral housing structures 16 may be provided with peripheral gap structures. For example, peripheral conductive housing structures 16 may be provided with one or more gaps such as gaps 18, as shown in FIG. 1. The gaps in peripheral housing structures 16 may be filled with dielectric such as polymer, ceramic, glass, air, other dielectric materials, or combinations of these materials. Gaps 18 may divide peripheral housing structures 16 into one or more peripheral conductive segments. There may be, for example, two peripheral conductive segments in peripheral housing structures 16 (e.g., in an arrangement with two of gaps 18), three peripheral conductive segments (e.g., in an arrangement with three of gaps 18), four peripheral conductive segments (e.g., in an arrangement with four of gaps 18, etc.). The segments of peripheral conductive housing structures 16 that are formed in this way may form parts of antennas in device 10.

If desired, openings in housing 12 such as grooves that extend partway or completely through housing 12 may extend across the width of the rear wall of housing 12 and may penetrate through the rear wall of housing 12 to divide the rear wall into different portions. These grooves may also extend into peripheral housing structures 16 and may form antenna slots, gaps 18, and other structures in device 10. Polymer or other dielectric may fill these grooves and other housing openings. In some situations, housing openings that form antenna slots and other structure may be filled with a dielectric such as air.

In a typical scenario, device 10 may have one or more upper antennas and one or more lower antennas (as an example). An upper antenna may, for example, be formed at the upper end of device 10 in region 22. A lower antenna may, for example, be formed at the lower end of device 10 in region 20. The antennas may be used separately to cover identical communications bands, overlapping communications bands, or separate communications bands. The antennas may be used to implement an antenna diversity scheme or a multiple-input-multiple-output (MIMO) antenna scheme.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, etc.

Figure 2:
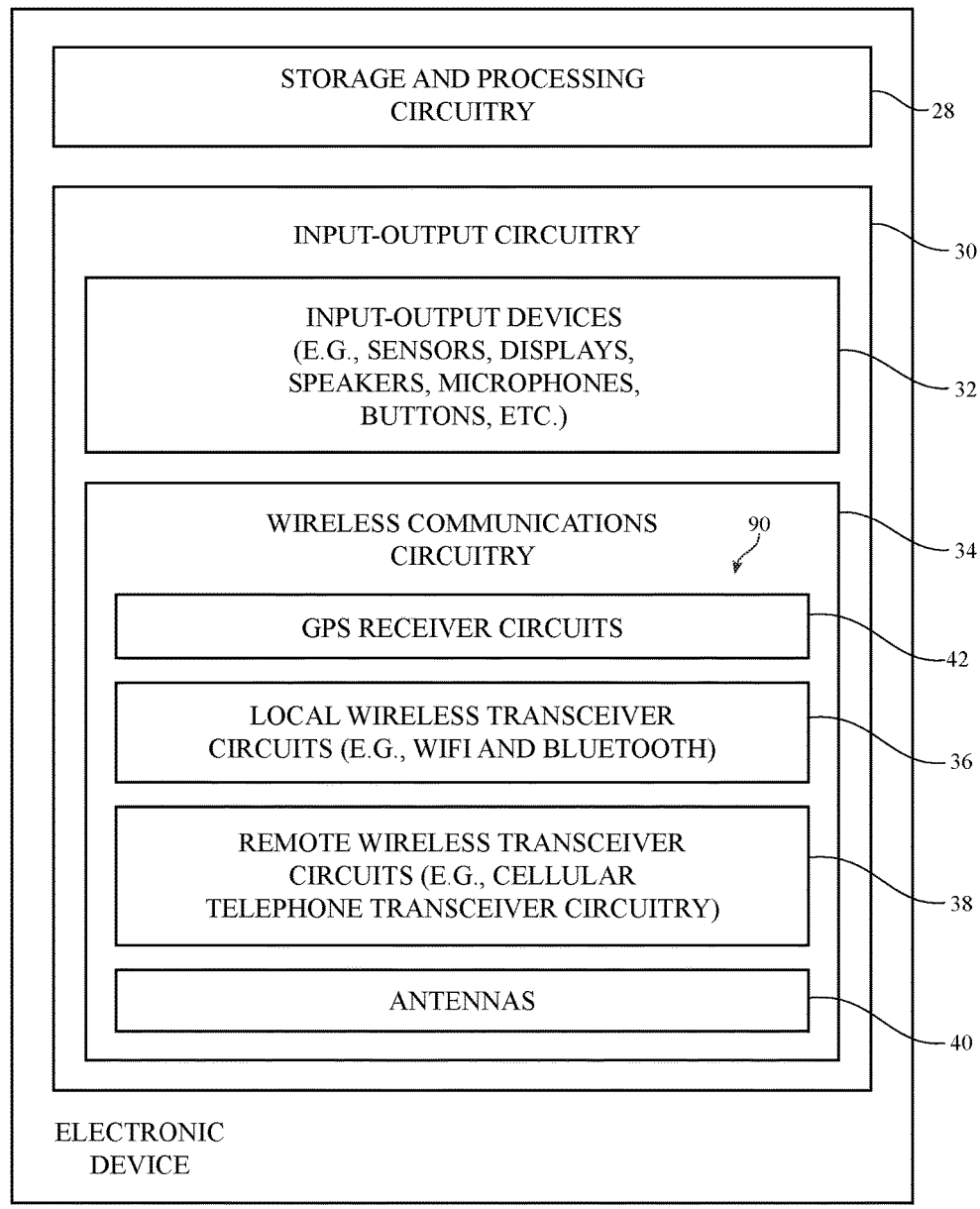
FIG. 2 is a schematic diagram of illustrative circuitry in an electronic device in accordance with an embodiment.

A schematic diagram showing illustrative components that may be used in device 10 of FIG. 1 is shown in FIG. 2. As shown in FIG. 2, device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, multiple-input and multiple-output (MIMO) protocols, antenna diversity protocols, etc.

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch screens, displays without touch sensor capabilities, buttons, joysticks, scrolling wheels, touch pads, key pads, keyboards, microphones, cameras, buttons, speakers, status indicators, light sources, audio jacks and other audio port components, digital data port devices, light sensors, position and orientation sensors (e.g., sensors such as accelerometers, gyroscopes, and compasses), capacitance sensors, proximity sensors (e.g., capacitive proximity sensors, light-based proximity sensors, etc.), fingerprint sensors (e.g., a fingerprint sensor integrated with a button such as button 24 of FIG. 1 or a fingerprint sensor that takes the place of button 24), etc.

Input-output circuitry 30 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36, 38, and 42. Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in frequency ranges such as a low communications band from 700 to 960 MHz, a low-midband from 960 to 1710 MHz, a midband from 1710 to 2170 MHz, a high band from 2170 to 2700 MHz, an ultra-high band from 3400 to 3700 MHz or other communications bands between 600 MHz and 4000 MHz or other suitable frequencies (as examples).

Circuitry 38 may handle voice data and non-voice data. Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, near field communications (NFC) circuitry, etc. Wireless communications circuitry 34 may include global positioning system (GPS) receiver equipment such as GPS receiver circuitry 42 for receiving GPS signals at 1575 MHz or for handling other satellite positioning data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, dipole antenna structures, monopole antenna structures, hybrids of these designs, etc. Different types of antennas may be used for different bands and combinations of bands. For example, one type of antenna may be used in forming a local wireless link antenna and another type of antenna may be used in forming a remote wireless link antenna.

Figure 3:
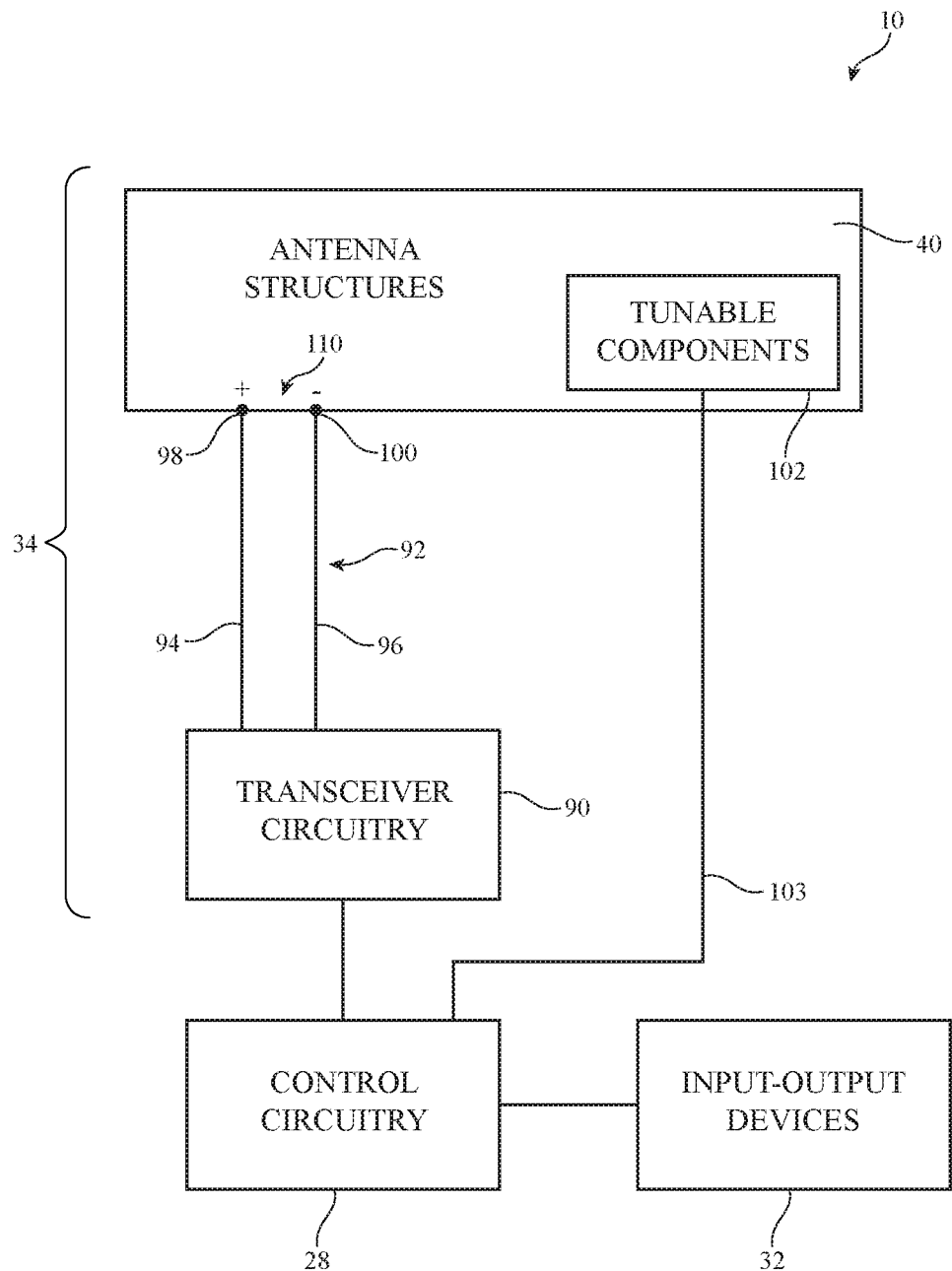
FIG. 3 is a schematic diagram of illustrative wireless circuitry in accordance with an embodiment.

As shown in FIG. 3, transceiver circuitry 90 in wireless circuitry 34 may be coupled to antenna structures 40 using paths such as path 92. Wireless circuitry 34 may be coupled to control circuitry 28. Control circuitry 28 may be coupled to input-output devices 32. Input-output devices 32 may supply output from device 10 and may receive input from sources that are external to device 10.

To provide antenna structures such as antenna(s) 40 with the ability to cover communications frequencies of interest, antenna(s) 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna(s) 40 may be provided with adjustable circuits such as tunable components 102 to tune antennas over communications bands of interest. Tunable components 102 may be part of a tunable filter or tunable impedance matching network, may be part of an antenna resonating element, may span a gap between an antenna resonating element and antenna ground, etc.

Tunable components 102 may include tunable inductors, tunable capacitors, or other tunable components. Tunable components such as these may be based on switches and networks of fixed components, distributed metal structures that produce associated distributed capacitances and inductances, variable solid state devices for producing variable capacitance and inductance values, tunable filters, or other suitable tunable structures. During operation of device 10, control circuitry 28 may issue control signals on one or more paths such as path 103 that adjust inductance values, capacitance values, or other parameters associated with tunable components 102, thereby tuning antenna structures 40 to cover desired communications bands.

Path 92 may include one or more transmission lines. As an example, signal path 92 of FIG. 3 may be a transmission line having a positive signal conductor such as line 94 and a ground signal conductor such as line 96. Lines 94 and 96 may form parts of a coaxial cable, a stripline transmission line, or a microstrip transmission line (as examples). A matching network (e.g., an adjustable matching network formed using tunable components 102) may include components such as inductors, resistors, and capacitors used in matching the impedance of antenna(s) 40 to the impedance of transmission line 92. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components.

Transmission line 92 may be coupled to antenna feed structures associated with antenna structures 40. As an example, antenna structures 40 may form an inverted-F antenna, a slot antenna, a hybrid inverted-F slot antenna or other antenna having an antenna feed 110 with a positive antenna feed terminal such as terminal 98 and a ground antenna feed terminal such as ground antenna feed terminal 100. Positive transmission line conductor 94 may be coupled to positive antenna feed terminal 98 and ground transmission line conductor 96 may be coupled to ground antenna feed terminal 100. Other types of antenna feed arrangements may be used if desired. For example, antenna structures 40 may be fed using multiple feeds. The illustrative feeding configuration of FIG. 3 is merely illustrative.

Control circuitry 28 may use information from a proximity sensor (see, e.g., sensors 32 of FIG. 2), wireless performance metric data such as received signal strength information, device orientation information from an orientation sensor, device motion data from an accelerometer or other motion detecting sensor, information about a usage scenario of device 10, information about whether audio is being played through speaker 26, information from one or more antenna impedance sensors, and/or other information in determining when antenna 40 is being affected by the presence of nearby external objects or is otherwise in need of tuning. In response, control circuitry 28 may adjust an adjustable inductor, adjustable capacitor, switch, or other tunable component 102 to ensure that antenna 40 operates as desired. Adjustments to component 102 may also be made to extend the coverage of antenna 40 (e.g., to cover desired communications bands that extend over a range of frequencies larger than antenna 40 would cover without tuning).

Figure 4:
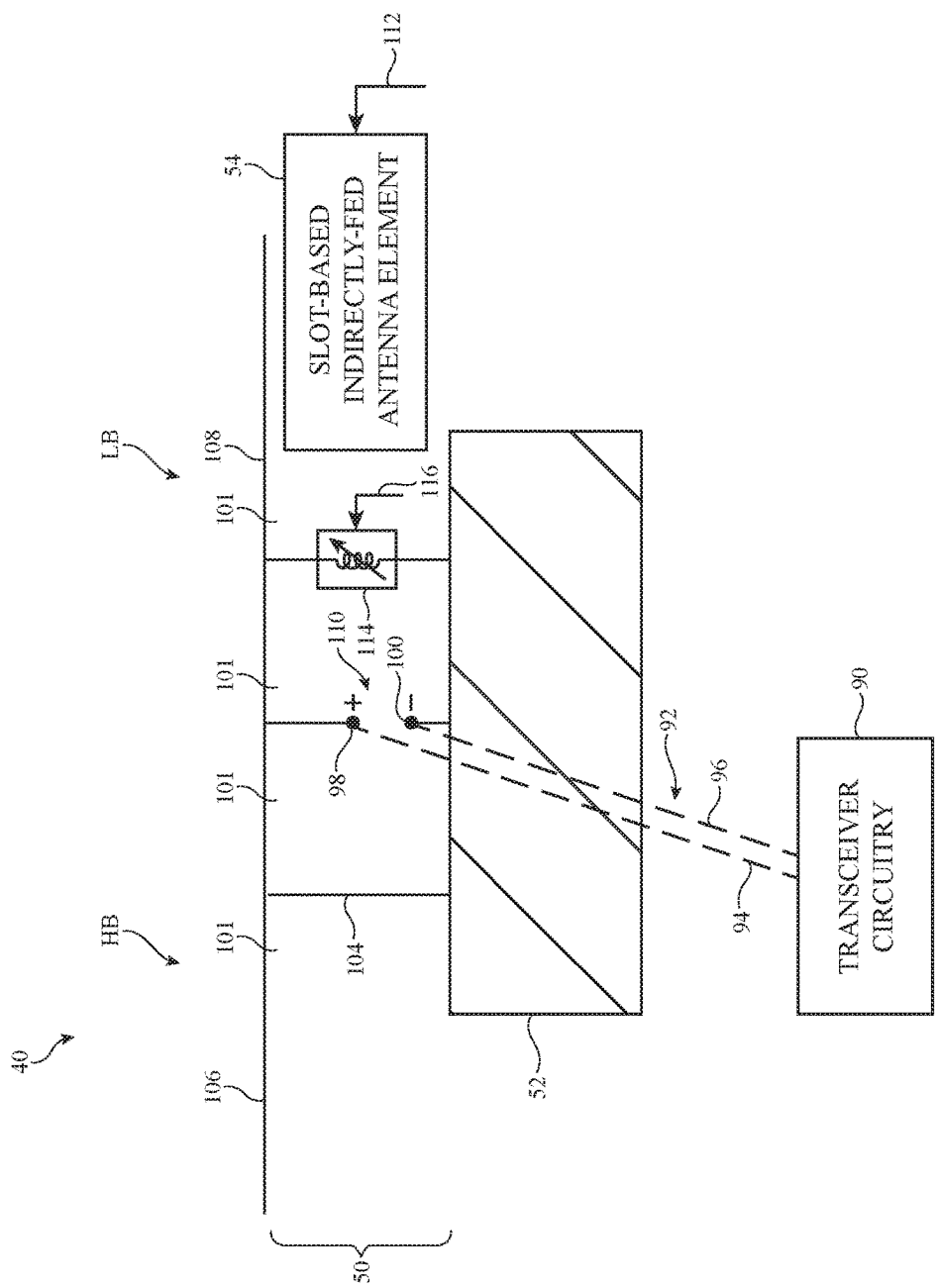
FIG. 4 is a diagram of an illustrative tunable antenna in accordance with an embodiment.

An illustrative antenna of the type that may be used in device 10 (e.g., in region 20 and/or region 22 of FIG. 1) is shown in FIG. 4. As shown in FIG. 4, antenna 40 may include a directly-fed antenna resonating element such as inverted-F antenna resonating element 50, an indirectly fed antenna resonating element such as slot-based indirectly-fed antenna element 54 (sometimes referred to herein as slot 54 or indirectly-fed slot 54), and ground structures such as antenna ground 52. The conductive structures that form inverted-F antenna resonating element 50, slot-based indirectly-fed antenna element 54, and antenna ground 52 may be formed from conductive housing structures, from electrical device components in device 10, from printed circuit board traces, from strips of conductor such as strips of wire and metal foil, or other conductive structures.

As shown in FIG. 4, transceiver circuitry 90 may be coupled to antenna 40 using transmission line structures 92 that include positive transmission line conductor 94 and ground transmission line conductor 96. Positive transmission line conductor 94 may be coupled to positive antenna feed terminal 98 and ground transmission line conductor 96 may be coupled to ground antenna feed terminal 100 of antenna feed 110. Circuits such as impedance matching circuits, filters, switches, duplexers, diplexers, and other circuitry may, if desired, be interposed in transmission line path 92.

Antenna resonating element 50 may include one or more inverted-F antenna resonating element arms such as arms 106 and 108 (e.g., resonating element 50 may be a dual band inverted-F antenna resonating element). Arms 106 and 108 may, for example, extend from opposing sides of antenna feed 110. A short circuit (return) path such as short circuit path 104 may couple resonating element arms 106 and 108 to antenna ground 52. Arms 106 and 108 of resonating element 50 may be separated from antenna ground 52 by a dielectric-filled opening such as dielectric gap 101. Gap 101 may be formed using air, plastic, and/or other dielectric materials that separate the conductive material in arms 106 and 108 from ground 52. Short circuit path 104 may be coupled between arms 106 and 108 and ground 52 in parallel with feed 110, for example. In one suitable arrangement, arms 106 and 108 of resonating element 50 may be formed from a segment of peripheral conductive housing structures 16 extending between two peripheral dielectric gaps 18 (FIG. 1) whereas antenna ground 52 is formed from conductive portions of housing 12 (e.g., portions of a rear wall of housing 12 and portions of peripheral conductive housing structures 16 that are separated from arms 106 and 108 by peripheral gaps 18).

The lengths of arms 106 and 108 may be selected to allow antenna 40 to support communications in one or more desired frequency bands. For example, the length of each arm may be approximately equal to one-quarter of the corresponding wavelength of operation. Arms 106 and 108 may have different lengths to support different frequencies of operation. In the example of FIG. 4, arm 108 is longer than arm 106 and may therefore support lower frequencies than arm 106 (e.g., arm 106 may sometimes be referred to herein as high band or midband arm 106 whereas arm 108 is sometimes referred to herein as low band arm 108). As an example, arm 108 may support an antenna resonance in a cellular low band (LB) between 700 MHz and 960 MHz or other suitable frequencies whereas arm 106 supports an antenna resonance in cellular midband and/or high band (HB). The example of FIG. 4 is merely illustrative. If desired, arm 106 may be longer than arm 108 or arms 106 and 108 may have the same length. Resonating element arms 106 and 108 may have one or more bends or may follow any desired paths (e.g., paths having curved and/or straight segments).

Inverted-F antenna resonating element arms 106 and 108 may be directly fed using feed terminals 98 and 100 (e.g., transmission line 92 may contact feed terminals 98 and 100 and may convey antenna currents that flow over arms 106 and 108 via feed terminal 98). If desired, antenna 40 may include one or more antenna resonating elements that are not directly fed (i.e., one or more indirectly fed antenna resonating elements). For example, antenna 40 may include an indirectly fed antenna element such as slot-based indirectly fed antenna element 54. Slot-based indirectly fed antenna element 54 may be coupled to antenna resonating element 50 by near field electromagnetic coupling and may be used to modify the frequency response of antenna 40 so that antenna 40 operates at desired frequencies.

Slot-based element 54 may support a resonance of antenna 40 in one or more desired frequency bands. The length or perimeter of slot-based element 54 may be selected to resonate in one or more desired frequency bands. In one suitable arrangement, slot-based element 54 may support a resonance in a frequency band that is not covered by arms 106 and 108 of inverted-F antenna resonating element 50. For example, slot-based element 54 may have an elongated length that is selected to support a resonance in an ultra-high band between 3400 MHz and 3700 MHz (e.g., a length between 10 mm and 15 mm, between 5 mm and 20 mm, between 1 mm and 15 mm, etc.).

In order to minimize the amount of space required to implement antenna 40 within device 10, slot-based element 54 may handle antenna signals that are conveyed over transmission line 92 and feed 110 of inverted-F antenna resonating element 50 (e.g., without requiring a separate feed and transmission line directly connected to slot-based element 54). In this example, slot-based element 54 may be indirectly-fed by inverted-F antenna resonating element 50 via near field electromagnetic coupling. For example, while a fundamental mode of low band arm 108 may support resonance in low band LB, a harmonic mode of low band arm 108 may near field couple to slot-based element 54 to induce antenna currents to flow around the perimeter of slot-based element 54 within the ultra-high band between 3400 MHz and 3700 MHz.

In the example of FIG. 4, slot-based indirectly fed antenna element 54 is based on a slot antenna structure. Slot antenna structures may include open slot structures (i.e., slots with one open end and one closed end) and closed slot structures (i.e., slots that are completely surrounded by metal). Slots for a slot-based indirectly fed antenna element may be formed between metal structures in antenna resonating element 50 and/or antenna ground 52. Plastic, air, and/or other dielectric materials may fill the slot.

If desired, the frequencies supported by slot-based indirectly fed antenna element 54 may be adjusted using adjustable circuitry (e.g., adjustable circuitry including one or more tunable components 102 of FIG. 3). The adjustable circuitry for controlling the resonance of slot-based indirectly fed antenna element 54 may be adjusted (tuned) using control signals 112 generated by control circuitry 28 (FIG.

2) or any other desired control circuitry. By tuning the adjustable circuitry associated with slot-based indirectly fed antenna element 54 using control signals 112, antenna 40 may be tuned to cover different operating frequencies of interest.

If desired, tuning circuitry 114 (e.g., circuitry including one or more tunable components 102 of FIG. 3) may be coupled between antenna resonating element 50 and ground 52. As shown in FIG. 4, tuning circuitry 114 includes an adjustable inductor coupled between antenna resonating element 50 and antenna ground 52 (i.e., adjustable inductor 114 may bridge gap 101). Adjustable inductor 114 may exhibit an inductance value that is adjusted in response to control signals 116 received from control circuitry 28. Adjustable inductor 114 may be adjusted to tune the frequency response of antenna resonating element 50. The example of FIG. 4 is merely illustrative. If desired, multiple adjustable circuits 114 (e.g., adjustable inductors) may be coupled between resonating element 50 and ground 52 and/or between different portions of resonating element 50.

Figure 5:
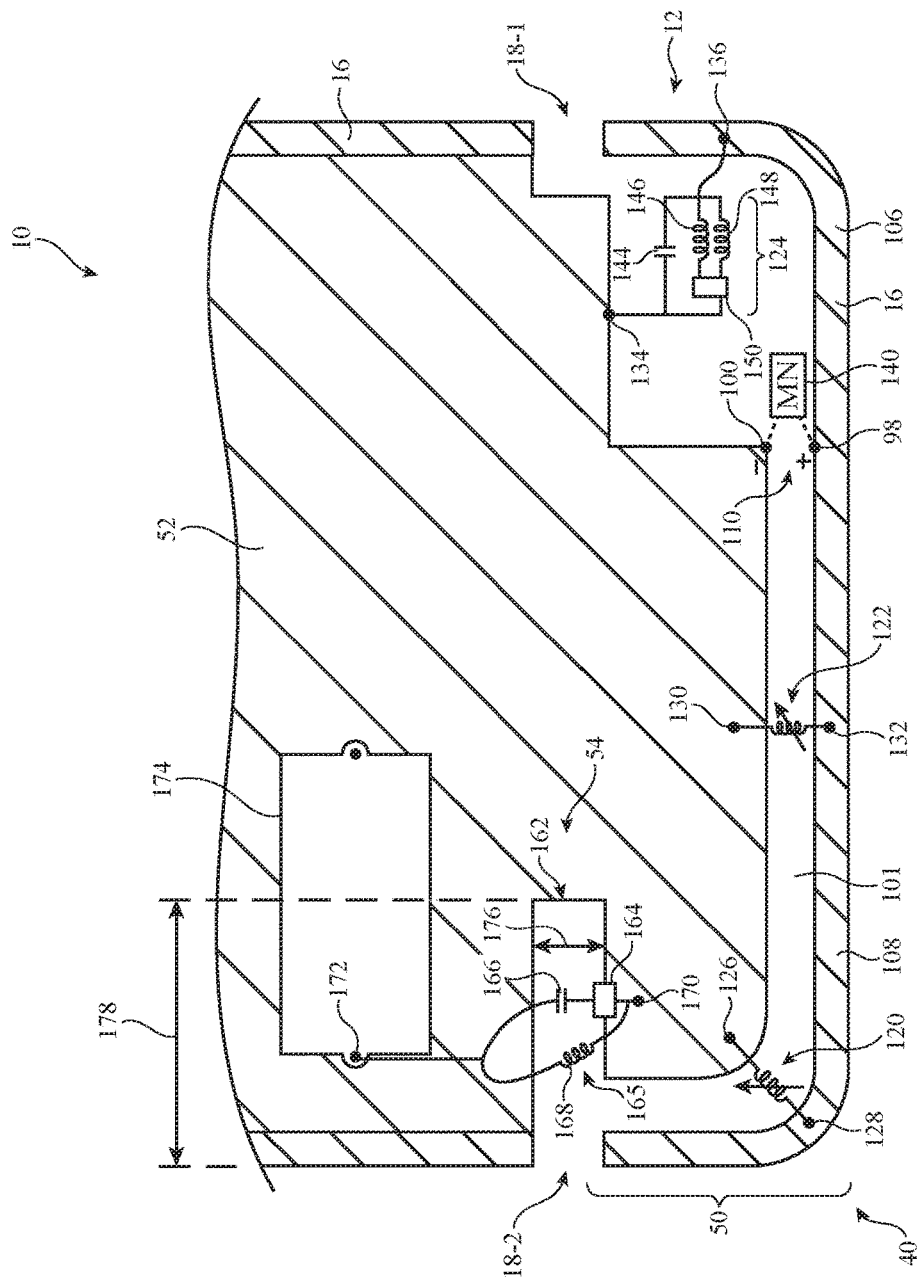
FIG. 5 is a diagram of an illustrative tunable antenna having an indirectly-fed adjustable slot element in accordance with an embodiment.

FIG. 5 is a diagram showing how antenna 40 having dual-arm inverted-F antenna resonating element 50 and slot-based indirectly-fed antenna resonating element 54 may be formed using conductive portions of housing 12. As shown in FIG. 5, gap 101 (sometimes referred to herein as slot 101) may have an elongated shape extending between peripheral conductive structures 16 and ground 52. Slot 101 may be filled with dielectric material such as air and/or plastic. For example, plastic may be inserted into portions of slot 101 and this plastic may be flush with the outside of housing 12.

Arms 106 and 108 of inverted-F antenna resonating element 50 may be formed using a segment of peripheral conductive structures 16 that extends between two peripheral gaps 18 (e.g., a first peripheral gap 18-1 and a second peripheral gap 18-2). Feed 110 may be coupled across slot 101 (e.g., positive antenna feed terminal 98 may be coupled to peripheral conductive structures 16 whereas ground antenna feed terminal 100 is coupled to ground plane 52). One or more return paths for inverted-F antenna resonating element 50 such as path 104 of FIG. 4 may be formed using a fixed conductive path bridging slot 101 or using adjustable components such as adjustable components 120, 122, and/or 124. Adjustable components 120, 122, and 124 may sometimes be referred to herein as tuning components, tunable components, tuning circuits, tunable circuits, or adjustable tuning components (e.g., components 120, 122, and 124 may be formed using tunable circuits 102 of FIG. 3).

In the example of FIG. 5, adjustable component 120 bridges slot 101 at a first location along slot 101 (e.g., component 120 may be coupled between terminal 126 on ground plane 52 and terminal 128 on peripheral conductive structures 16). Adjustable component 122 may bridge slot 101 at a second location along slot 101 (e.g., component 122 may be coupled between terminal 130 on ground plane 52 and terminal 132 on peripheral conductive structures 16). Adjustable component 124 may bridge slot 101 at a third location along slot 101 (e.g., component 124 may be coupled between terminal 134 on ground plane 52 and a terminal 136 on peripheral conductive structures 16). Terminal 130 may be interposed between ground antenna feed terminal 100 and terminal 126 on ground plane 52. Terminal 132 may be interposed between positive antenna feed terminal 98 and terminal 128 on peripheral conductive structures 16. Ground antenna feed terminal 100 may be interposed between terminal 130 and terminal 134 on ground plane 52. Positive antenna feed terminal 98 may be interposed between terminal 132 and terminal 136 on peripheral conductive structures 16.

Antenna 40 may include an adjustable matching network such as adjustable matching circuitry 140 that is interposed on transmission line path 92 (FIGS. 3. and 4). Control circuitry 28 (FIG. 2) may provide control signals to adjust matching circuitry 140 (e.g., to provide a selected matching impedance between transmission line 92 and antenna feed 110). If desired, impedance sensing circuitry such as coupler circuitry (e.g., a directional coupler or other radio-frequency coupler) may be used to tap antenna signals flowing to and from antenna 40. The tapped antenna signals from the coupler circuitry may be conveyed to control circuitry 28 over a feedback path and may be used to determine the impedance (e.g., phase and magnitude data) of antenna 40 during operation of wireless circuitry 34, if desired.

Adjustable matching circuitry 140 may include switching circuitry and circuit components such as resistive, capacitive, and/or inductive components coupled in any desired manner between transmission line 92, ground 52, antenna feed 110, and/or peripheral conductive structure 16. The switching circuitry in adjustable matching circuitry 140 may be controlled to place circuitry 140 in one of any desired number of states. Matching circuitry 140 may exhibit different impedances in each of the states. For example, matching circuitry 140 may have a first state at which matching circuitry 140 exhibits a first impedance and a second state at which matching circuitry exhibits a second impedance. This is merely illustrative and, in general, any desired components may be formed in matching network 140 to adjust the impedance in any desired manner.

Components 120, 122, and 124 may include switches coupled to fixed components such as inductors for providing adjustable amounts of inductance or an open circuit between ground 52 and peripheral conductive structures 16. Components 120, 122, and 124 may also include fixed components that are not coupled to switches (e.g., capacitor 144) or a combination of components that are coupled to switches and components that are not coupled to switches. These examples are merely illustrative and, in general, components 120, 122, and 124 may include other components such as adjustable return path switches, switches coupled to capacitors, or any other desired components.

Adjustable component 120 may include one or more inductors coupled to a radio-frequency switching circuit. In one illustrative example, adjustable component 120 may include two inductors coupled in parallel between terminals 126 and 128. A radio-frequency switching circuit may selectively couple the inductors between terminals 126 and 128. Adjustable component 122 may include one or more inductors coupled to a radio-frequency switching circuit. In one illustrative example, adjustable component 122 may include four inductors coupled in parallel between terminals 130 and 132. A radio-frequency switching circuit may selectively couple the inductors between terminals 130 and 132. Adjustable component 124 may include a radio-frequency switching circuit such as switch 150. A first inductor 146 and a second inductor 148 may be coupled in parallel between terminal 136 and switch 150. A capacitor 144 may also be coupled between terminals 134 and 136.

Using multiple adjustable components at different locations along slot 101 may provide antenna 40 with flexibility to accommodate different loading conditions (e.g., different loading conditions that may arise due to the presence of a user's hand or other external object on various different portions of device 10 adjacent to various different corresponding portions of antenna 40). Adjustable components in antenna 40 may be used to tune antenna coverage, may be used to restore antenna performance that has been degraded due to the presence of an external object such as a hand or other body part of a user, and/or may be used to adjust for other operating conditions and to ensure satisfactory operation at desired frequencies. Adjustable components 120, 122, and 124, and matching circuitry 140 may be controlled (i.e., placed in a desired state) using control signals received from control circuitry 28. For example, component 122 may be adjusted to tune the response of antenna 40 within the low band, component 124 may be adjusted to tune the response of antenna 40 within the midband, and component 120 may be adjusted to account for different antenna loading conditions (e.g., different loading conditions that may arise due to the presence of a user's hand or other external object adjacent to different locations on device).

Slot 101 may have an elongated shape. In the example of FIG. 5, slot 101 has a U shape that runs along the periphery of device 10 between peripheral conductive structures 16 (e.g., housing sidewalls) and other conductive portions of device 10 (e.g., ground 52). The ends of slot 101, which may sometimes be referred to as open ends, may be formed by gaps 18 (e.g., gaps 18-1 and 18-2 of FIG. 5). The length of slot 101 may be about 4-20 cm, more than 2 cm, more than 4 cm, more than 8 cm, more than 12 cm, less than 25 cm, less than 15 cm, less than 10 cm, or other suitable length. Slot 101 may have a width of about 2 mm (e.g., less than 4 mm, less than 3 mm, less than 2 mm, more than 1 mm, more than 1.5 mm, 1-3 mm, etc.) or other suitable width. In the example of FIG. 5, slot 101 has a U shape. If desired, slot 101 may have other shapes.

As shown in FIG. 5, in some configurations, an additional slot 162 may be formed in ground plane 52 (e.g., ground 52 may define at least three edges of slot 162). Slot 162 may have a width 176 and an elongated length 178 that is greater than width 176. Slot 162 may extend from an end of slot 101. For example, slot 162 may be aligned with gap 18-2 and may have the same width as gap 18-2 if desired. Slot 162 may have any desired width 176 (e.g., about 2 mm, less than 4 mm, less than 3 mm, less than 2 mm, less than 1 mm, more than 0.5 mm, more than 1.5 mm, more than 2.5 mm, 1-3 mm, etc.). Length 178 of slot 162 may, for example, extend perpendicular to width 176 from an end of slot 101 to an opposing end defined by ground plane 52. Slot 162 may have any desired length 178 (e.g., 10-15 mm, more than 5 mm, more than 10 mm, more than 15 mm, more than 30 mm, less than 30 mm, less than 20 mm, less than 15 mm, less than 10 mm, between 5 and 20 mm, etc.).

Slot 162 may form indirectly-fed slot antenna resonating element 54. Slot 162 may therefore contribute to the frequency response of antenna 40. Length 178 and width 176 of slot 162 (i.e., the perimeter of slot 162) may be selected so that slot 162 supports desired operating frequencies. For example, in scenarios where length 178 is sufficiently greater than width 176, length 176 may be selected to be approximately equal to one-half of the desired wavelength of operation (e.g., a wavelength corresponding to an ultra-high band frequency) given the dielectric loading conditions at slot 162. In the example of FIG. 5, slot 162 is an open slot having an open end defined by an end of slot 101 and gap 18-2. This is merely illustrative and, if desired, slot 162 may be implemented using a closed slot that is surrounded by ground plane 52.

In one suitable arrangement, inverted-F antenna resonating element 50 may support a resonance at low band (LB) frequencies (e.g., 700-960 MHz), midband (MB) frequencies (e.g., 1710-2170 MHz), and high band (HB) frequencies (e.g., 2170-2700 MHz). For example, the length of low band arm 108 may be selected to support a resonance at the low band frequencies (e.g., in a fundamental mode of arm 108) whereas the length of midband arm 106 may be selected to support a resonance at the midband frequencies. If desired, a harmonic mode of arm 108 may support a resonance in a portion of the high band frequencies (e.g., from approximately 2170-2400 MHz). Inverted-F antenna resonating element 50 may be directly fed using antenna feed 110 to cover these frequencies of operation.

The harmonic mode of arm 108 may induce antenna currents around the perimeter of slot 162 via near field electromagnetic coupling at the operating frequency associated with slot 162 (e.g., as defined by the perimeter of slot 162). For example, the harmonic mode of arm 108 may induce antenna currents at slot 162 at ultra-high band (UHB) frequencies (e.g., frequencies from 3400-3700 MHz). In this way, slot 162 may be induced to exhibit a resonance in the ultra-high band for antenna 40.

In some scenarios, the harmonic mode of low band arm 108 may not be capable of providing satisfactory coverage of the upper end of the high band HB (e.g., at frequencies from approximately 2400-2700 MHz). In order to cover the entirety of the high band (e.g., including frequencies up to 2700 MHz), tuning circuits such as adjustable circuitry 165 may be coupled across slot 162.

As shown in FIG. 5, adjustable circuitry 165 may include inductive, switching, and/or capacitive components such as inductor 168, switching circuit 164, and capacitor 166. Inductor 168 may be coupled between terminals 170 and 172 on ground 52. Terminals 170 and 172 may be coupled to ground 52 on opposing sides of slot 162. Inductor 168 may be, for example, a fixed inductor having a fixed inductance value. Inductor 168 may serve to pull some of the antenna current induced at slot 162 to adjust the resonant frequency of the slot to a higher frequency than would otherwise be present in the absence of inductor 168 (e.g., to a frequency in the ultra-high band between 3400 and 3700 MHz). Capacitor 166 and radio-frequency switching circuit 164 may be coupled in series between terminals 172 and 170 (in parallel with inductor 168). Switching circuit 164 may be toggled to couple or decouple capacitor 166 between terminals 170 and 172. When capacitor 166 is also coupled across slot 162, the capacitor may effectively nullify at least a portion of the inductance of inductor 168. By lowering the effective inductance across slot 162 when capacitor 166 is coupled across slot 162, the resonant frequency of slot 162 may be shifted from the ultra-high band to the upper end of the high band (e.g., to frequencies between approximately 2400 and 2700 MHz). In this way, antenna 40 may be controlled to cover the entirety of the high band from 2170 MHz to 2700 MHz even if the harmonic mode of low band arm 108 is unable to cover the upper end of the high band. As examples, inductor 168 may exhibit an inductance of approximately 10 nH, between 8 nH and 12 nH, between 5 nH and 15 nH, or other desired inductances. Capacitor 166 may exhibit a capacitance of 0.5 pF, between 0.3 and 0.7 pF, between 0.1 and 0.9 pF, or other desired capacitances, as examples.

Switching circuit 164 may include any desired switches. For example, switching circuit 164 may include a single-pole single-throw switch coupled between terminal 170 and capacitor 166. In a first state, the single-pole single-throw switch may be open and capacitor 166 may be decoupled from terminal 170. In a second state, the single-pole single-throw switch may be closed to couple capacitor 166 to terminal 170 in parallel with inductor 168. In the first state, the slot resonance of slot 162 may be at a given frequency (e.g., in the ultra-high band), whereas in the second state, the slot resonance may be at a lower frequency (e.g., in the high band). This example is merely illustrative and, if desired, other switch arrangements may be used.

Terminals 170 and 172 coupled to ground plane 52 may sometimes be referred to herein as ground or grounding terminals. If desired, one or both of terminals 170 and 172 may be coupled to antenna ground 52 (e.g., to conductive portions of housing 12) using conductive fasteners such as screws. The conductive fasteners may, if desired, be shared with other components in device 10. For example, the conductive fasteners may be used to short other components to ground 52 and/or to mechanically secure the components to ground 52. Sharing the conductive fasteners between antenna 40 and the other components may optimize space consumption within device 10, for example.

In the example of FIG. 5, a shared conductive fastener may short both ground terminal 172 associated with adjustable component 165 of indirectly-fed slot element 162 and electronic component 174 to ground 52. The shared conductive fastener may also serve to mechanically secure adjustable component 165 and electronic component 174 to ground 52 (e.g., to a conductive wall of housing 12). Electronic component 174 may be any desired component in electronic device 10. For example, electronic component 174 may be an input-output device such as a sensor, speaker, microphone, button, or status indicator, may be a shielding structure, a conductive portion of display 14, a portion of transceiver circuitry 90, or any other desired component. In one suitable arrangement, electronic component 174 may include circuitry for providing haptic feedback for a user such as a motor or vibrator. This example is merely illustrative and, if desired, the conductive fasteners used to short terminals 172 and 170 to ground 52 may be shared between two or more components or may be unshared, if desired.

The shapes and dimensions of slot 162, ground 52, and slot 101 in FIG. 5 are merely illustrative. If desired the slots can have multiple segments extending in different angles/directions, may include straight and/or curved edges, and may in general have any desired shape. Similarly, ground 52 may include any desired conductive structures and may have any desired shape.

Figure 6:
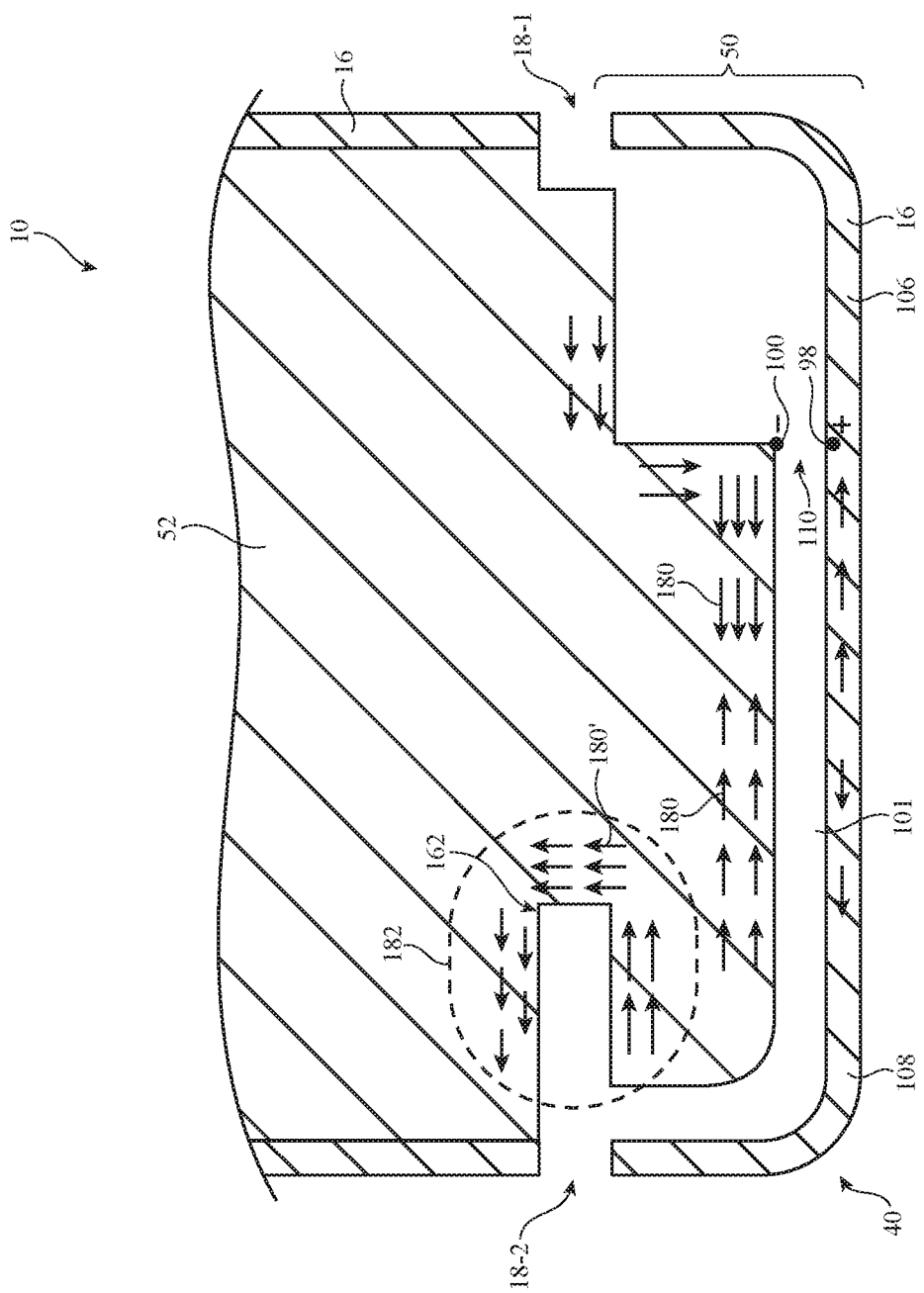
FIG. 6 is a diagram of illustrative current distribution in an antenna of the type shown in FIG. 5 in accordance with an embodiment.

FIG. 6 is a diagram showing the current distribution on antenna 40 associated with the resonance of slot 162 in the ultra-high band (e.g., 3500 MHz or 3400 to 3700 MHz). In the example of FIG. 6, the adjustable circuitry of FIG. 5 is not shown for the sake of clarity.

As shown in FIG. 6, directly-fed antenna currents 180 may flow over arms 106 and 108 of inverted-F antenna resonating element 50 and ground plane 52 (i.e., antenna currents corresponding to radio-frequency antenna signals conveyed directly to antenna resonating element 50 over transmission line 92 and feed 110). Antenna currents 180 at harmonic frequencies of low band arm 106 may induce indirectly-fed antenna currents 180' on ground plane 52 around the perimeter of slot 162 (e.g., via near field electromagnetic coupling). Antenna currents 180' may flow around slot 162 at frequencies within the ultra-high band (e.g., between 3400 MHz and 3700 MHz). At frequencies within the ultra-high band (e.g., at 3500 MHz), there may be a relatively high density of antenna currents 180' within region 182 of ground plane 52 around slot 162. In this way, slot 162 may contribute to the coverage of antenna 40 within the ultra-high band.

Figure 7:
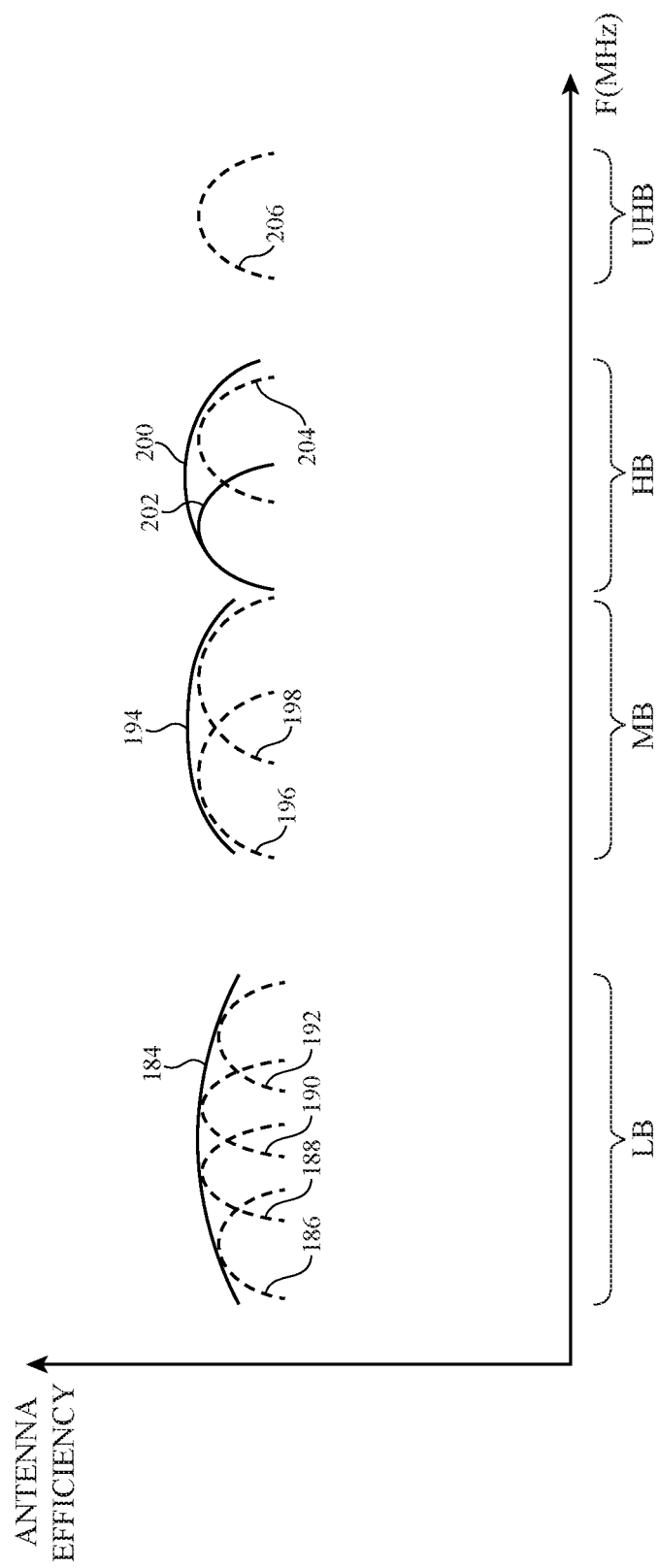
FIG. 7 is a graph of antenna performance (antenna efficiency) as a function of frequency for a tunable antenna of the type shown in FIG. 5 in accordance with an embodiment.

FIG. 7 is a graph of antenna performance (antenna efficiency) as a function of frequency for an illustrative antenna of the type shown in FIGS. 5 and 6. As shown in FIG. 7, antenna 40 may exhibit resonances in a low band LB, midband MB, high band HB, and ultra-high band UHB. This example is merely illustrative and, if desired, antenna 40 may exhibit resonances in a subset of these bands and/or in additional bands (e.g., a low-middle band LMB extending from 1400 MHz to 1710 MHz or other suitable frequency ranges).

Low band LB may extend from 700 MHz to 960 MHz or another suitable frequency range. Tunable components such as components 120, 122, 124, and/or matching circuitry 140 may be used to tune the response of antenna 40 in low band LB. As shown in FIG. 7, antenna 40 may have an antenna efficiency characterized by curve 184 in low band LB. The antenna efficiency of curve 184 may be achieved by tuning antenna 40 to place antenna 40 in one of four or more tuning states (e.g., a first state characterized by curve 186, a second state characterized by curve 188, a third state characterized by curve 190, a fourth state characterized by curve 192, etc.). For example, adjustable component 122 may include four inductors with each state associated with one of the inductors being coupled between terminals 130 and 132.

Midband MB may extend from 1710 MHz to 2170 MHz or another suitable frequency range. Tunable components such as components 120, 122, 124, and/or matching circuitry 140 may be used to tune the response of antenna 40 in midband MB. As shown in FIG. 7, antenna 40 may have an antenna efficiency characterized by curve 194 in midband MB. The antenna efficiency of curve 194 may be achieved by tuning antenna 40 to place antenna 40 in one of two or more tuning states (e.g., a first state characterized by curve 196, a second state characterized by curve 198, etc.). For example, coupling inductor 146 of FIG. 5 between terminals 134 and 136 may place the antenna in the first tuning state, whereas coupling inductor 148 of FIG. 5 between terminals 134 and 136 may place the antenna in the second tuning state.

High band HB may extend from 2170 MHz to 2700 MHz or another suitable frequency range. Ultra-high band UHB may extend from 3400 MHz to 3700 MHz or another suitable frequency range. As shown in FIG. 7, antenna 40 may have an antenna efficiency characterized by curves 200, 202, and 204 in high band HB and curve 206 in ultra-high band UHB. The antenna efficiency of curves 200 and 206 may be achieved by tuning antenna 40 to place antenna 40 in one of two or more tuning states (e.g., a first state characterized by curve 204, a second state characterized by curve 206, etc.). For example, coupling capacitor 166 of FIG. 5 between terminals 170 and 172 using switch 164 may place the antenna in the first tuning state (with improved antenna performance in high band HB as characterized by curve 204). In the first tuning state, the harmonic mode of low band arm 108 covers frequencies shown by curve 202 and the resonant frequency of slot 162 covers frequencies shown by curve 204 so that antenna 40 collectively exhibits response 200. Opening switch 164 so that only inductor 168 (and not capacitor 166) is coupled between terminals 170 and 172 may place the antenna in the second tuning state (with improved antenna performance in ultra-high band UHB as characterized by curve 206). In the second tuning state, the harmonic mode of low band 108 covers frequencies shown by curve 202 and the resonant frequency of slot 162 covers frequencies shown by curve 206.

If desired, adjustable component 165 for slot 162 may be formed on a substrate such as a flexible printed circuit board.

Figure 8:
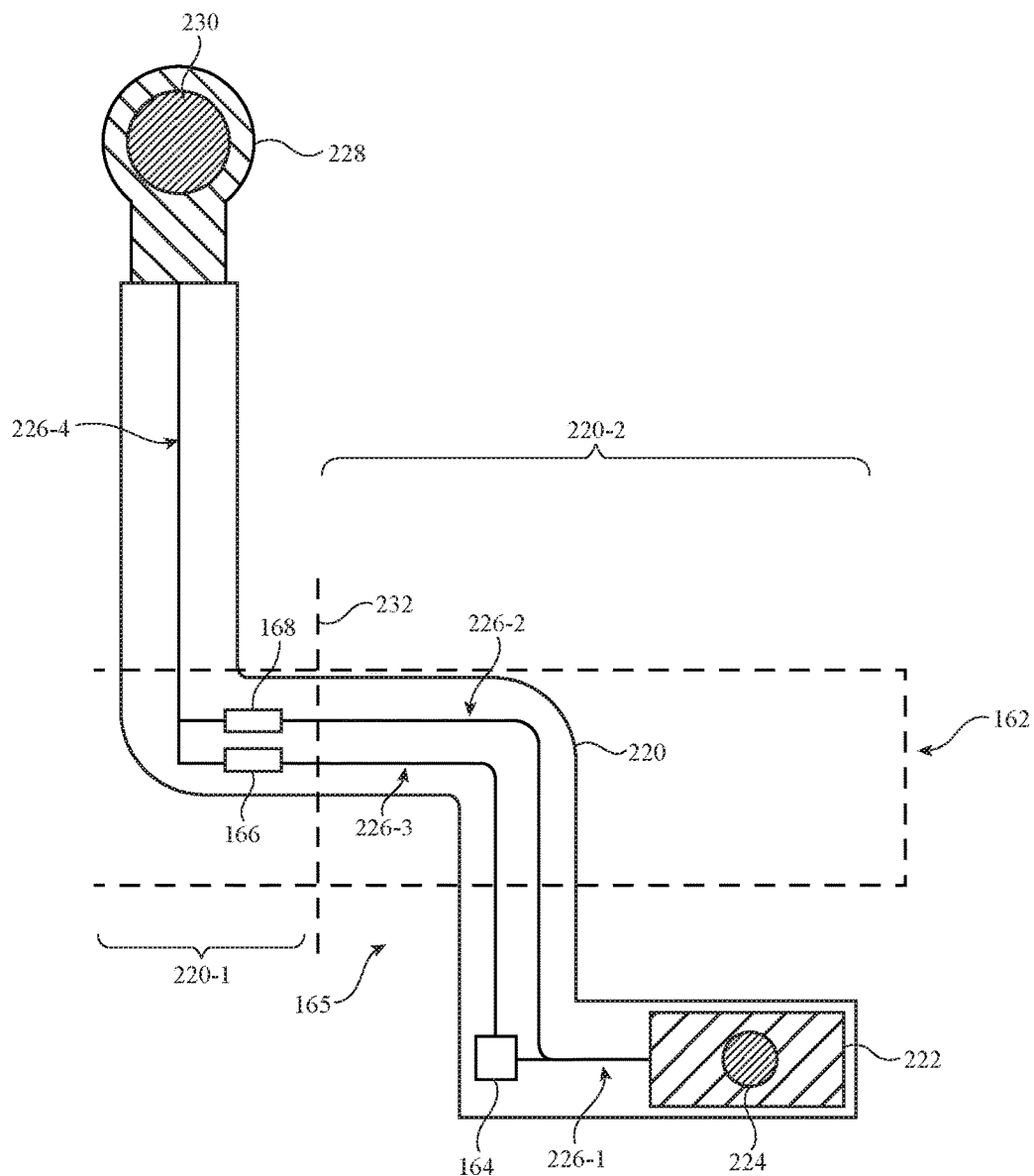
FIG. 8 is a top view of illustrative adjustable components that may bridge an indirectly-fed slot in a tunable antenna in accordance with an embodiment.

FIG. 8 is a diagram showing how adjustable component 165 may include a flexible printed circuit board that bridges slot 162. As shown in FIG. 8, adjustable component 165 may be formed on a flexible printed circuit board such as flexible printed circuit board 220. Flexible printed circuit board 220 may be a printed circuit formed from sheets of polyimide or other flexible polymer layers. Flexible printed circuit board 220 may include patterned metal traces for carrying signals between components on the flexible printed circuit board. If desired, the patterned metal traces may form grounding pads to be coupled to additional conductive components within electronic device 10.

Flexible printed circuit board 220 may be coupled between two ground terminals (e.g., terminals 170 and 172). Ground terminals 170 and 172 may be formed from any desired components. For example, ground terminal 170 may include a conductive structure 228 whereas ground terminal 172 includes a conductive structure 222. Conductive structures 228 and 222 may include conductive traces on flexible printed circuit board 220, conductive contact pads on flexible printed circuit board 220, conductive brackets, metal support plates or stiffeners, and/or other conductive structures. Flexible printed circuit board 220 may be fastened or attached to housing 12 or other structures using one or more conductive fasteners such as fasteners 224 and 230. Fastener 224 may include a conductive screw, conductive pin, conductive clip, conductive spring, conductive bracket, or other conductive fastener that extends through an opening in flexible printed circuit to attach the flexible printed circuit to antenna ground 52 (e.g., to a conductive portion of housing 12). Fastener 230 may include a conductive screw, conductive pin, conductive clip, conductive spring, conductive bracket, or other conductive fastener that extends through an opening in conductive structure 228 to attach the flexible printed circuit to antenna ground 52 (e.g., to a conductive portion of housing 12). Fastener 230 may mechanically secure conductive structure 228 to ground plane 52 (e.g., a conductive portion of housing 12). Conductive structure 228 may electrically couple trace 226 (e.g., trace portion 226-4) on flexible printed circuit 220 to fastener 230, thereby electrically coupling trace 226 to ground. If desired, fastener 230 may also be used to short and/or mechanically secure other electronic components such as component 174 of FIG. 5 to ground 52.

Trace 226 may include trace portions 226-1, 226-2, 226-3, and 226-4 and may be formed on flexible printed circuit 220. First trace portion 226-1 may be coupled to ground via conductive structure 222 and fastener 224. Portions 226-2 and 226-3 may extend in parallel from portion 226-1. Portion 226-2 may bypass switch 164 and couple portion 226-1 to inductor 168 (e.g., without any intervening components). Because portion 226-2 is not coupled to switch 164, inductor 168 may always be connected across slot 162. Portion 226-3, on the other hand, is coupled to capacitor 166 through switch 164. In a first state, switch 164 may connect capacitor 166 across slot 162. In a second state, switch 166 may be open and capacitor 166 is disconnected across slot 162. By switching capacitor 166 on and off, the resonance of antenna 40 may be tuned (e.g., to cover a portion of high band HB or ultra-high band UHB as shown in FIG. 7).

If desired, flexible printed circuit 220 may be bent about bend axis 232. The bend in flexible printed circuit 220 may result in a first portion (220-1) of the flexible printed circuit being bent at an angle relative to the second portion (220-2) of the flexible printed circuit. First portion 220-1 of the flexible printed circuit may be bent at an angle of approximately 90° or another desired angle relative to second portion 220-2 of the flexible printed circuit. In one illustrative embodiment, portion 220-1 of flexible printed circuit 220 may be positioned adjacent to a peripheral conductive structure (e.g., peripheral conductive structure 16 in FIG. 5) that forms a sidewall for the electronic device. The example of FIG. 8 where flexible printed circuit 220 is bent around one bend axis (i.e., axis 232) is merely illustrative. If desired, flexible printed circuit 220 may have two or more bends around two or more bend axes. Alternatively, flexible printed circuit 220 may be unbent if desired.

Figure 9:
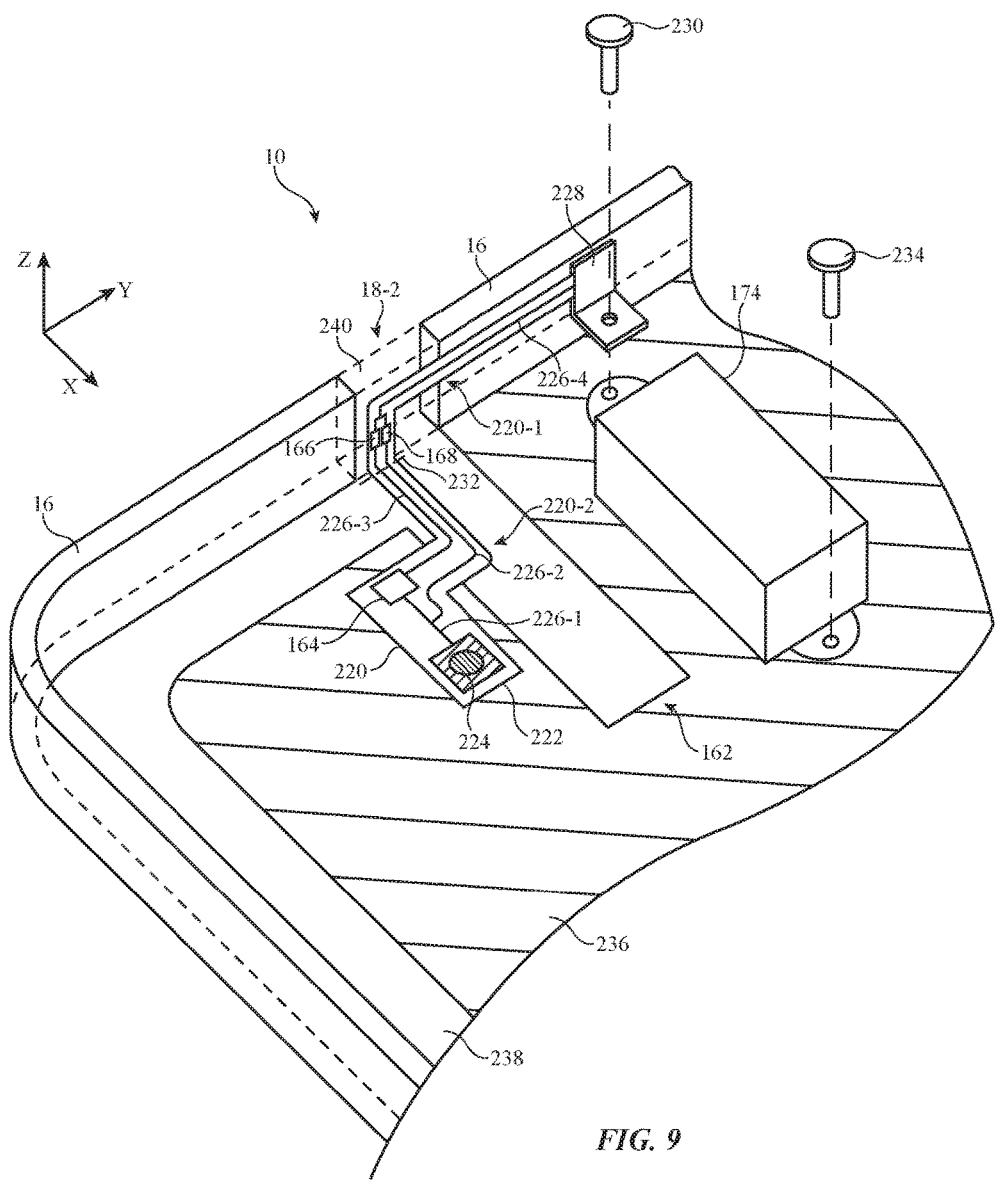
FIG. 9 is a top perspective view of an illustrative electronic device having adjustable components formed over an indirectly-fed slot in a tunable antenna in accordance with an embodiment.

FIG. 9 is a perspective view of electronic device 10 showing how flexible printed circuit 220 may bridge slot 162. As shown in FIG. 9, antenna ground 52 may include a conductive portion 236 of housing 12. Conductive housing portion 236 may, for example, form a conductive support plate or wall (e.g., a conductive backplate or rear housing wall) for device 10. Conductive housing portion 236 may, if desired, extend across the width of device 10 (e.g., between two opposing sidewalls formed by peripheral housing structures 16). If desired, conductive housing portion 236 and the opposing sidewalls of device 10 may be formed from a single integral piece of metal or portion 236 may otherwise be shorted to the opposing sidewalls of device 10. Conductive housing portion 236 may form an exterior rear surface of device 10 or may be covered with a dielectric layer 238 such as a thin glass, sapphire, ceramic, or sapphire layer or other dielectric coating. In scenarios where layer 238 is formed, layer 238 may form the exterior rear surface of device 10 and may or may not serve to hide conductive housing portion 236 from the view of the user. Fasteners 224, 230, and 234 may be screws or other fasteners (e.g., conductive adhesive, conductive clips, conductive springs, clips, etc.) that are attached to threaded openings, holes, or other structures on conductive housing portion 236.

As shown in FIG. 9, peripheral dielectric gap 18-2 may be filled with a dielectric 240 such as plastic. Capacitor 166 and inductor 168 on flexible printed circuit 168 may be aligned with slot 162 in conductive housing portion 236 and gap 18-2 in peripheral conductive structures 16 (e.g., capacitor 166 and inductor 168 may overlap slot 162 and/or gap 18-2 when circuit board 220 is mounted or assembled in device 10). Flexible printed circuit 220 may be bent around bend axis 232 such that first portion 220-1 of flexible printed circuit 220 (a portion on which capacitor 166 and inductor 168 are formed) is positioned in the Y-Z plane and second portion 220-2 of flexible printed circuit 220 (a portion on which switch 164 is formed) is positioned in the X-Y plane.

Fastener 224 may couple second flexible printed circuit portion 220-2 to conductive housing portion 236 whereas fastener 230 may couple first flexible printed circuit portion 220-1 to conductive housing portion 236. As shown in FIG. 9, trace 226-4 of flexible printed circuit 220 may be coupled to conductive structure 228 (e.g., a metal bracket or clip). Fastener 230 may pass through an opening in bracket 228 and an opening in a portion of component 174 to reach conductive housing portion 236. Fastener 230 may be coupled to a bracket portion of electronic component 174 that both grounds component 174 and attaches component 174 to conductive housing portion 236, for example. If desired, additional fasteners such as fastener 234 may attach an additional bracket portion of electronic component 174 to conductive housing portion 236.

The example of FIGS. 6 and 8 in which adjustable circuitry 165 includes a series-coupled switch 164 and capacitor 166 coupled in parallel with inductor 168 between terminals 170 and 172 is merely illustrative. If desired, other arrangements may be used to form adjustable circuitry 165.

Figure 10A:
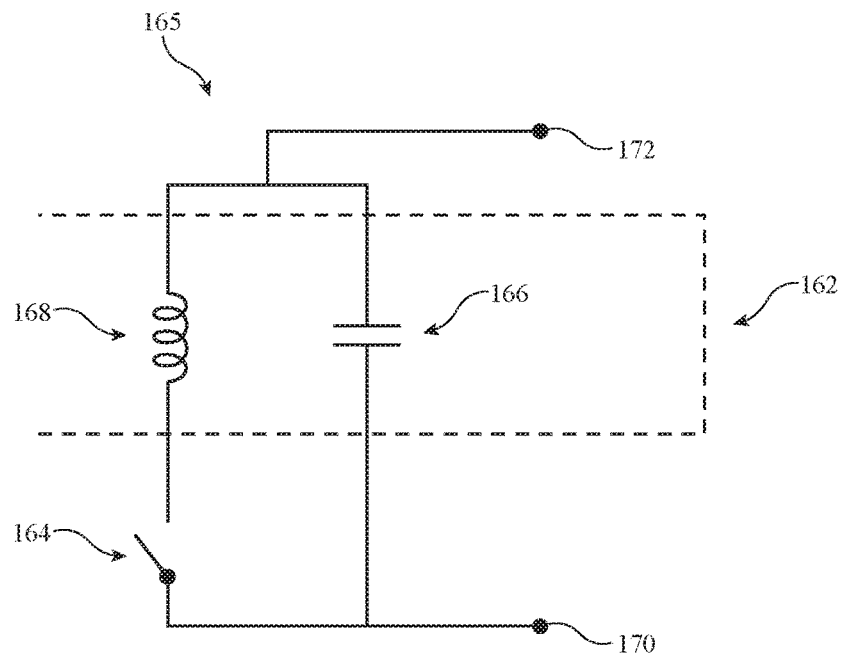
FIGS. 10A and 10B are circuit diagrams of illustrative adjustable circuitry that may be used to bridge an indirectly-fed slot in a tunable antenna in accordance with an embodiment.
Figure 10B:
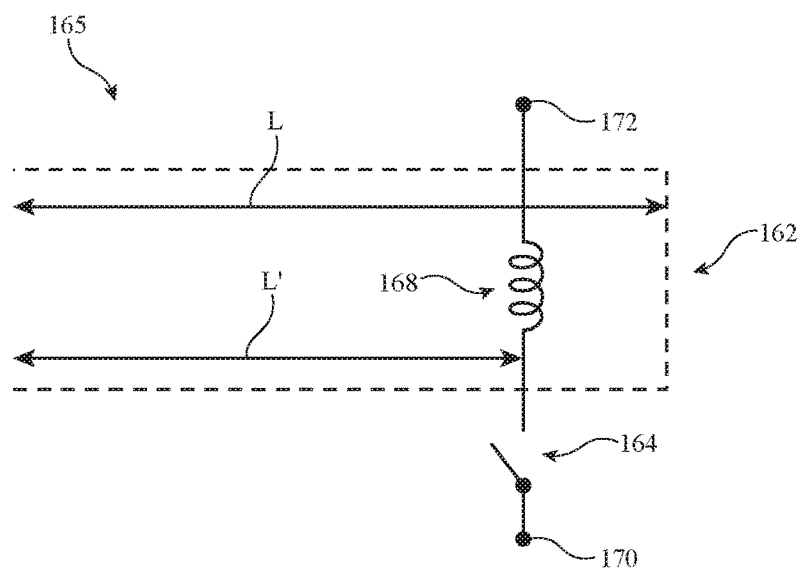

FIGS. 10A and 10B are circuit diagrams of illustrative switching arrangements that may be used to form adjustable component 165 across slot 162.

As shown in FIG. 10A, if desired, capacitor 166 may be implemented as a bypass capacitor coupled between ground terminals 170 and 172. In this arrangement, inductor 168 may be a switchable inductor formed using switch 164 coupled in series with inductor 168 terminals 170 and 172 and in parallel with capacitor 166. In this arrangement, capacitor 166 is always coupled across slot 162. Capacitor 166 may serve to adjust the resonant frequency of slot 162 to a lower frequency than would otherwise be supported in the absence of capacitor 166. For example, antenna 40 may be configured to resonate in the high band (e.g., from 2300 to 2700 MHz) when capacitor 166 is coupled across slot 162. When switch 164 is closed and inductor 168 is also coupled across slot 162, the inductor may effectively nullify at least a portion of the capacitance of capacitor 166. By lowering the effective capacitance across slot 162, the resonant frequency of slot 162 may be raised from the high band to the ultra-high band (e.g., to frequencies from 3400 to 3700 MHz).

As shown in FIG. 10B, if desired, adjustable circuit 165 may include inductor 168 and switch 164 coupled in series between terminals 170 and 172 across slot 162 (e.g., without any capacitors). In this embodiment, when switch 164 is closed, the length of slot 162 is effectively shortened from L to L'. This may serve to increase the frequency coverage of slot 162 (e.g., from frequencies within high band HB to frequencies within ultra-high band UHB).

The examples of FIGS. 10A and 10B are merely illustrative. The components of adjustable circuit 165 may be arranged in any desired manner between terminals 170 and 172. If desired, adjustable circuit 165 may include one or more (e.g., a network) of discrete components such as surface mount technology capacitors and inductors and/or may include distributed capacitances and inductances.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
a housing having peripheral conductive housing structures;
an antenna resonating element arm formed from a segment of the peripheral conductive housing structures and configured to resonate in a first frequency band;
an antenna ground that comprises an indirectly-fed antenna resonating element, wherein the indirectly-fed antenna resonating element is configured to resonate in a second frequency band that is higher than the first frequency band and is indirectly fed by a harmonic mode of the antenna resonating element arm;
an antenna feed having a positive antenna feed terminal coupled to the peripheral conductive housing structures and a ground antenna feed terminal coupled to the antenna ground; and
an additional antenna resonating element arm formed from an additional segment of the peripheral conductive housing structures, wherein the segment of the peripheral conductive housing structures and the additional segment of the peripheral conductive housing structures extend from opposing sides of the positive antenna feed terminal.

2. The electronic device defined in claim 1, wherein the indirectly-fed antenna resonating element comprises a slot in the antenna ground.

3. The electronic device defined in claim 2, wherein the antenna ground defines at least three edges of the slot and the slot is aligned with a dielectric-filled gap in the peripheral conductive housing structures.

4. The electronic device defined in claim 3,
wherein the additional segment is configured to resonate in a third frequency band that is different than the first and second frequency bands.

5. The electronic device defined in claim 4, further comprising an adjustable component that is coupled between first and second terminals on the antenna ground and that bridges the slot.

6. The electronic device defined in claim 5, wherein the adjustable component is configured to adjust a resonance of the slot between the second frequency band and a fourth frequency band.

7. The electronic device defined in claim 6, wherein the fourth frequency band is higher than the third frequency band and lower than the second frequency band.

8. The electronic device defined in claim 7, wherein the adjustable circuitry comprises a component that is coupled to a switch, and the switch is adjustable between a first state in which the switch couples the component across the slot and a second state in which the switch decouples the component across the slot.

9. The electronic device defined in claim 8, wherein the second frequency band comprises frequencies between 3400 MHz and 3700 MHz and the fourth frequency band comprises frequencies between 2300 MHz and 2700 MHz.

10. An antenna comprising:
an antenna ground;
an inverted-F antenna resonating element arm configured to resonate in a first frequency band;
an antenna feed having a positive antenna feed terminal coupled to the inverted-F antenna resonating element arm and a ground antenna feed terminal coupled to the antenna ground;
a slot having at least three edges defined by the antenna ground; and
an adjustable circuit having a first terminal coupled to the antenna ground at a first side of the slot and a second terminal coupled to the antenna ground at a second side of the slot, wherein the adjustable circuit is configured to tune the slot between a second frequency band that is higher than the first frequency band and a third frequency band that is a higher than the second frequency band.

11. The antenna defined in claim 10, wherein the slot is indirectly fed by a harmonic mode of the inverted-F antenna resonating element arm via near field electromagnetic coupling.

12. The antenna defined in claim 10, wherein an additional slot separates the inverted-F antenna resonating element arm from the antenna ground and the slot has an open end defined by an end of the additional slot.

13. The antenna defined in claim 10, wherein the adjustable circuit comprises an electronic component coupled in series with a switch between the first and second terminals.

14. The antenna defined in claim 13, wherein the slot is configured to resonate in the second frequency band when the switch is in a first state and the slot is configured to resonate in the third frequency band when the switch is in a second state.

15. The antenna defined in claim 14, wherein the component comprises a capacitor, the switch couples the capacitor between the first and second terminals and the slot resonates in the second frequency band when the switch is in the first state, and the switch decouples the capacitor between the first and second terminals and the slot resonates in the third frequency band when the switch is in the second state.

16. The antenna defined in claim 15, wherein the adjustable circuit further comprises an inductor that is coupled between the first and second terminals in parallel with the capacitor and the switch.

17. The antenna defined in claim 14, wherein the component comprises an inductor, the switch decouples the inductor between the first and second terminals and the slot resonates in the second frequency band when the switch is in the first state, and the switch couples the inductor between the first and second terminals and the slot resonates in the third frequency band when the switch is in the second state.

18. The antenna defined in claim 17, wherein the adjustable circuit further comprises a capacitor that is coupled between the first and second terminals in parallel with the inductor and the switch.

19. An electronic device, comprising:

a housing having first and second conductive sidewalls and a planar conductive layer extending between the first and second conductive sidewalls;

a dielectric-filled gap in the first conductive sidewall that divides the first conductive sidewall into first and second portions;

an antenna resonating element formed from at least the first portion of the first conductive sidewall;

an antenna ground formed from at least the planar conductive layer and the second portion of the first conductive sidewall, wherein the planar conductive layer defines an elongated slot having a length extending along a longitudinal axis that is aligned with the dielectric-filled gap;

a flexible printed circuit having a first ground terminal coupled to the antenna ground at a first side of the elongated slot and a second ground terminal coupled to the antenna ground at a second side of the elongated slot, wherein the flexible printed circuit has a first portion that extends parallel to the planar conductive layer and a second portion that is bent relative to the first portion; and adjustable circuitry on the flexible printed circuit and configured to adjust an operating frequency of the elongated slot.

20. The electronic device defined in claim 19, further comprising:

a vibrator; and a fastener that shorts both the first ground terminal of the flexible printed circuit and the vibrator to the planar conductive layer.

\* \* \* \* \*